(12) United States Patent
Fontijn et al.

(10) Patent No.: US 7,814,291 B2
(45) Date of Patent: Oct. 12, 2010

(54) FLEXIBLE FORMATTING FOR UNIVERSAL STORAGE DEVICE

(75) Inventors: Wilhelmus Franciscus Johannes Fontijn, Eindhoven (NL); Declan Patrick Kelly, Shanghai (CN); Wilhelmus Jacobus Van Gestel, Heeze (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 281 days.

(21) Appl. No.: 10/560,682

(22) PCT Filed: Jun. 15, 2004

(86) PCT No.: PCT/IB2004/050908

§ 371 (c)(1), (2), (4) Date: Dec. 14, 2005

(87) PCT Pub. No.: WO2004/112037

PCT Pub. Date: Dec. 23, 2004

(65) Prior Publication Data

US 2007/0101050 A1    May 3, 2007

(30) Foreign Application Priority Data

Jun. 19, 2003   (EP)   .................................. 03101811

(51) Int. Cl.
 G06F 12/02   (2006.01)
(52) U.S. Cl. .................................... 711/173; 369/30.03
(58) Field of Classification Search ............... 369/30.03, 369/30.04, 30.01, 30.05; 711/4, 147, 153, 711/163, 173
See application file for complete search history.

(56) References Cited

U.S. PATENT DOCUMENTS

| 5,592,450 A | | 1/1997 | Yonemitsu et al. |
| 5,721,856 A | | 2/1998 | Takeuchi |
| 5,757,571 A | * | 5/1998 | Basham et al. ............. 360/72.1 |
| 6,032,161 A | * | 2/2000 | Fuller ......................... 707/205 |

(Continued)

FOREIGN PATENT DOCUMENTS

EP    0817195 A2    1/1998

(Continued)

OTHER PUBLICATIONS

Van Der Aa et al, "Small Form Factor Optical Drive: Miniaturized Plastic High-Na Objective and Optical Drive", IEEE Joint International Symposium on Optical Memory and Optical Data Storage, Jul. 7, 2002, pp. 251-253.

(Continued)

Primary Examiner—Matt Kim
Assistant Examiner—Hal Schnee (57) ABSTRACT

The present invention relates to a record carrier, drive device and method of reading from or writing to the record carrier, wherein a predetermined navigation area (DN) is provided on said record carrier for storing at least one predetermined parameter specifying at least one of a logical format and an application format used on said record carrier. Thereby, a universal portable disc format can be provided, where a single disc can contain content in many formats from many different devices and all these content types can coexist. A clean separation of physical, logical and application level structures is thus possible without loosing any flexibility or ability of drive devices to maintain these structures.

29 Claims, 4 Drawing Sheets

U.S. PATENT DOCUMENTS

| | | | |
|---|---|---|---|
| 6,072,759 | A | 6/2000 | Maeda et al. |
| 6,081,447 | A * | 6/2000 | Lofgren et al. ......... 365/185.02 |
| 6,160,554 | A * | 12/2000 | Krause ....................... 715/804 |
| 6,260,043 | B1 * | 7/2001 | Puri et al. ................... 707/101 |
| 6,526,475 | B1 * | 2/2003 | Everett et al. .............. 711/111 |
| 6,538,969 | B1 | 3/2003 | Vitkus et al. |
| 6,636,958 | B2 * | 10/2003 | Abboud et al. ............. 711/173 |
| 6,693,869 | B1 * | 2/2004 | Ballantyne ................... 369/84 |
| 6,901,210 | B1 * | 5/2005 | Heo et al. ................... 386/125 |
| 7,043,620 | B2 * | 5/2006 | Matsuno et al. ............ 711/170 |
| 2002/0009028 | A1 | 1/2002 | Ijtsma et al. |
| 2002/0051630 | A1 | 5/2002 | Sasaki et al. |
| 2002/0064111 | A1 * | 5/2002 | Horie ..................... 369/47.54 |
| 2002/0068604 | A1 * | 6/2002 | Prabhakar et al. .......... 455/556 |
| 2002/0114233 | A1 * | 8/2002 | Sasaki et al. ............ 369/47.51 |
| 2002/0131767 | A1 * | 9/2002 | Auwens et al. .............. 386/95 |
| 2002/0181376 | A1 * | 12/2002 | Acker ..................... 369/59.25 |
| 2002/0191516 | A1 * | 12/2002 | Ito et al. .................. 369/53.22 |
| 2003/0009334 | A1 * | 1/2003 | Printz et al. ................. 704/256 |
| 2003/0026186 | A1 | 2/2003 | Ando et al. |
| 2003/0033051 | A1 * | 2/2003 | Wilkes ....................... 700/200 |
| 2003/0103429 | A1 * | 6/2003 | Senshu ..................... 369/47.24 |
| 2003/0108335 | A1 | 6/2003 | Nakamura et al. |
| 2003/0196027 | A1 * | 10/2003 | Maeda et al. ............... 711/103 |

FOREIGN PATENT DOCUMENTS

WO          0195331   A2    12/2001

OTHER PUBLICATIONS

Mc Murdie et al, "Packet Writing & CD Recording's Logical Next Step", Emedia Professional, vol. 10, No. 5, May 1997, pp. 30-38.

Optical Storage Technology Association: "Universal Disk Format Specification, OSTA-2, Revision 2.00", Apr. 3, 1998, p. 116.

* cited by examiner

FLEXIBLE FORMATTING FOR UNIVERSAL STORAGE DEVICE

The present invention relates to a record carrier, drive device and method of reading from or writing to the record carrier, such as an optical disc. In particular, the invention relates to a standard logical format for an optical disc.

The applicant has recently developed a miniature optical disc that records, plays back and erases data using the same precision blue lasers that are being developed for the next generation of high-definition disc based video recorders. A system of the miniature optical disc is known as SFFO (Small Form Factor Optical) or Portable Blue (PB) and shows that it is possible to store 4 Gigabytes on a 3-cm-disc, and to make a drive device, that can read it reliably, as small as a memory card. The PB disc will have a logical format that includes a standard file system, such as UDF (Universal Disc Format) as specified in the UDF specification Revision 2.01 by Optical Storage Technology Association (OSTA) dated 3 Apr. 1998 or a later version.

Current optical disc formats have officially a strict separation between physical layer, logical layer and application layer. However, until now the standardization of a new optical disc format started from an application. Consequently, the first versions of the format where optimized for a specific application, e.g. audio replay on CD, video playback on DVD and video recording on BD, even on the physical level. And as a result, the official separation of layers is not effectuated, complicating additions to and alterations of the standard.

One example is partitioning. The physical layer may offer large subdivisions in the form of sessions or small ones in the form of packets, but at the logical level current optical disc formats offer a unified address space. This is fine as a rule but excluding the possibility of having more than one logical partition was not necessary.

Another example is the presence of physical hard links. Especially for consumer electronics (CE) devices the use of physical hard links can be useful as it simplifies the device. However, by putting the physical addresses of such hard links in the standard, the evolution from a read-only published format to a incrementally written format is made unnecessarily difficult.

In addition, allocation strategy support is not supported from the physical level. As a result, drives cannot implement allocation strategies optimal for the particular drive type in a straightforward manner.

It therefore took considerable effort to enable data storage and recording on CD and DVD because these formats started out as read-only formats for an audio/visual application. Each time new features were added the original format was strained and this has lead to sub-optimal solutions. By focusing on one application at the start immediately a lot of flexibility was lost unnecessarily.

Currently there are many storage solutions, e.g. Flash or Microdrive, that all use a standard interface. So, although the properties of the storage devices are radically different, they can be used interchangeably with the same devices. The standard interface provides a block interface to the application and the application chooses the format of the data it records on disc. This approach has a significant advantage in that it allows for the same storage devices to be used in multiple host devices. The problem is that for removable drives, unless some special action is taken, the discs created in different host devices will not be exchangeable.

For a partition descriptor information (PD), it could be considered providing drives that conform to an existing drive interface, e.g., Compact Flash. This would allow PB to be used in many existing products, such as still picture cameras. Having access to such an existing installed base of customers is likely to spur the initial adoption of PD. The drawback to this approach is that no control is provided over what is written on the disc. In particular, the application can use any file system, so that exchanging discs between devices is in general not supported.

It is important to realize what this might mean for a user. The PD drive is attached to a still picture camera and some pictures are recorded, e.g., using JPEG. Then the PD disc is put into another device, which understands JPEG, but this device cannot mount the file system from the disc. For a non-expert user this is very confusing, as it appears that the content has been lost. A similar problem can occur with other devices that use a standard, if they are widely used.

In view of this, measures are required for enabling a standardization of the disc format in such a way that drive interfaces can provide an error free block device. In particular this requires standardizing defect management and handling the potential problem of hot-spots, where the application overwrites the same location too many times.

It is an object of the present invention to provide a record carrier, method and drive device for providing a universal disc format that can be standardized to a level which is independent of the application file format.

This object is achieved by a drive device, a record carrier, and by a reading or writing method. Accordingly, a drive readable area is provided which offers a space for at least one of logical level structures and application level structures. This space can be used to offer a generic way for the storage of specific definitions of logical formats and application formats.

With this approach, the disc format can be standardized to a level independent of the application file format. The goal here is to ensure that when the record carrier is put into the drive device, the system can recognize the files on disc although it may not understand the actual file content. This means that files can be written on the record carrier in multiple formats, e.g. MP3 audio, JPEG pictures, recorded in multiple devices and every application can see all the files. So, an audio player is able to recognize the JPEG files and ignore them, while accidental deletion can be prevented. Hence, a universal portable disc format can be implemented, where a single record carrier can contain content in many formats from many different devices and all these content types can coexist, while specific low level optimizations for specific applications are still possible.

It is however still possible to implement drive devices with a standard interface, e.g. Compact Flash, as long as the connected device includes an application that writes the selected format to the disc or the drive device itself provides this functionality.

The at least one predetermined parameter may comprise a disc descriptor information for specifying at least one of an identification of the record carrier, a type of the record carrier, and parameters applying to said record carrier as a whole.

Furthermore, the at least one predetermined parameter may comprise a partition descriptor information (PD) for specifying at least one of a nature of each partition on the record carrier, a type of each partition on the record carrier, a space associated with each partition on the record carrier, a fragment allocation to each partition on the record carrier, and specific rules for recording on each partition on the record carrier.

In addition thereto, an application use area may be provided in the navigation area for storing an application specific information available to at least one of a physical layer, a logical layer and an application layer of the drive device.

Thus, by providing the above areas, a unique opportunity is given to design the storage on the record carrier at a high degree of flexibility not known from previous standards. It offers an easy way for the addition of logical level and application specific structures on the lowest level within the standard. It enables, for instance, drive level optimizations in the logical layer, general application optimizations in the logical layer, and application specific optimizations in the physical layer. As a result, an unprecedented flexibility in employing the disc format and any future extensions is achieved, offering logical partitions, interleaved, fragmented, embedded and dynamically sized partitions, programmable physical hard links, allocation strategy support, application configuration and optimizations, general application support in the logical layer, scratch area for the drive, e.g. to record usage tracking for power optimizations, and a pointer and anchor pool, e.g. to speed up disc mounting.

The at least one parameter of the navigation area may be accessible by at least one of a logical layer and an application layer of the drive device by using a predetermined access command.

Furthermore, the access means may be arranged to provide a caching function for caching at least a part of the information provided on the navigation area, and/or to use pointers stored in the navigation area for partitioning the record carrier into separate areas, and/or to use the navigation area for determining the location of a starting address number in the logical address space for the record carrier as a whole or for a specific application, and/or for reserving space in a program area of the record carrier for specific file systems, allocation classes or applications, wherein properties or attributes can be assigned to the reserved space, and/or pointers into the reserved space and room for application specific data can be provided.

Additionally, the access means may be arranged to write to the navigation area a location information of data accessed at a rate higher than a predetermined number or an access pattern information for sequential data retrieval. A dynamic partitioning may be used for defining areas in the navigation area.

The access means may be arranged to apply a volume-based rights management to sessions of an information area of the record carrier. Moreover, a volume-based, partition-based or fragment-based defect management may be applied to the sessions of the information area of the record carrier.

Moreover, pointers stored in the navigation area may be used for applying a seeking function. This offers the opportunity for seek optimization to limit power consumption.

Furthermore, the navigation area may be used for selecting an application class for an application.

In particular, the navigation area may be arranged in a lead in area of the information area of the record carrier. Then, sessions provided in the information area can be written without separate lead-in and lead-out area. Furthermore, the sessions may have a granularity of one fragment and/or may have at least one of a varying size and a varying physical location.

The drive device may be a removable drive device for an optical disc. Furthermore, the drive device may comprises a standard interface for storage devices, e.g. a PCMCIA, Compact Flash, Newcard, or MMCA interface.

Further advantageous modifications are defined in the dependent claims.

The present invention will now be described on the basis of a preferred embodiment with reference to the accompanying drawings, in which.

The preferred embodiment will now be described in connection with a removable PB drive device which exposes a FAT based CF-II interface to legacy hosts such as a digital camera, a PDA or the like.

In connection with the present invention, the term "legacy" is used to indicate those formats, applications, data or devices, which have been inherited from languages, platforms, and techniques earlier than the current technology. Typically, the challenge is to keep the legacy features or applications running or legacy devices supported while converting it to newer, more efficient features or devices that make use of new technology and skills.

A storage device needs a file system so that the data can be stored and retrieved as files. The most common file system for CD-ROM is ISO 9660 which is the international standard version of the High Sierra Group file system and is designed for personal computers.

With the advent of the Digital Versatile Disc (DVD), the UDF file system has been added to the list. This is suitable for read-only, re-writable (RW) and recordable or write-once (R) discs and allows long file names, as for instance, the Joliett extension to ISO 9660. CD media require special consideration due to their nature. CD was originally designed for read-only applications which affects the way in which it is written. RW formatting consists of writing a lead-in, user data area, and lead-out. These areas may be written in any order.

Until recently, optical discs have not been used intensively as true random access devices. With the introduction of transparent defect management and speed-up of read and write cycles for optical discs, this type of use is expected to intensify. Multiple portable device types, e.g. video cameras or mobile phones, are expected to have PB drive devices as primary storage.

In the following preferred embodiment, UDF is used as the PB file system.

Figure 1:
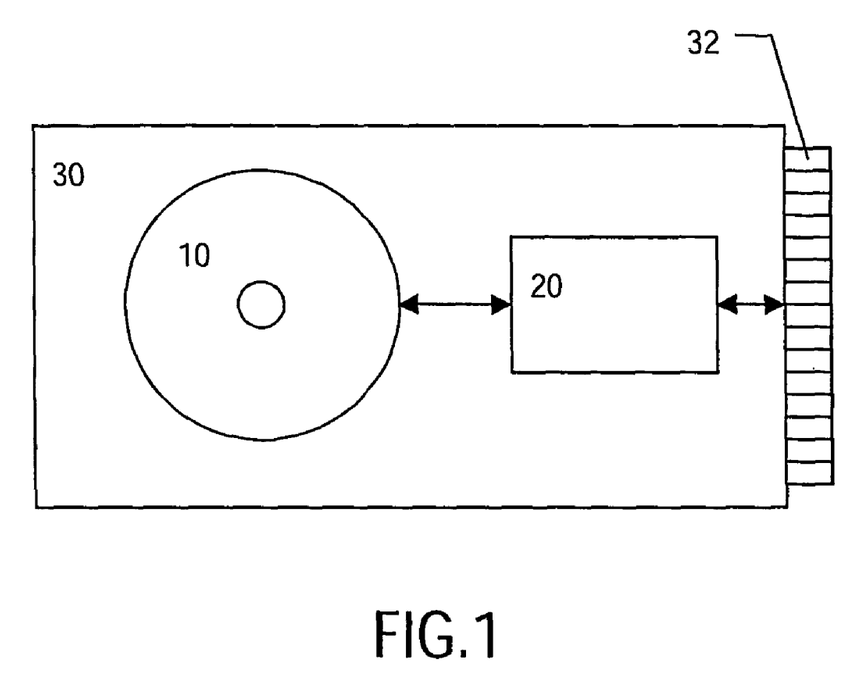
FIG. 1 shows a schematic block diagram of a removable drive device with a standard interface and input function according to the preferred embodiments of the present invention.

FIG. 1 shows a removable drive device 30 adapted e.g. to fit the Compact Flash form factor. Hence, the drive device 30 can be used to replace solid state memories. To achieve this, a standard CF-IL interface unit 20 with corresponding connection terminals 32 is provided. Due to the fact that the CF interface unit 20 is commonly used in connection with a FAT file system, it must be arranged to map from FAT to UDF when writing to the disc 10 of the removable drive device 30, and to map from UDF to FAT when reading from the disc 10.

FAT is the MS-DOS file system supported by most of today's operating systems. It comes in three different types, i.e. FAT 12, FAT 16 and FAT 32, wherein the names refer to the number of bits used by the entries in the file allocation table which gave the file system its name. The file allocation table is actually one of the structures inside the FAT file system as seen on-disc. The purpose of this table is to keep track of which areas of the disc are available and which areas are in use. The file allocation table can be regarded as a singly linked list. Each of the chains in the file allocation table specifies which parts of the disc belong to a given file or directory. The user data area is the area where the contents of the files and directories are stored.

According to the preferred embodiment, it is proposed to create a drive readable area in the lead-in that offers a space for logical level structures and application level structures. This area is called the drive navigation area (DN). This space is used to offer a generic way for the storage of specific definitions of logical formats and application formats. This disc navigation area DN can be used to provide a standardized disc format to a level that it is independent of the application file format. Thereby, it can be assured that the system can recognize the files on the disc 10 although it may not understand the actual file content. This means that files can be written on the disc 10 in multiple formats, e.g. MP3 audio or JPEG pictures, recorded in multiple devices and every application can see all the files.

The file system used by the application can be mapped by the interface unit 20 to the file system used on the disc 10. In this case the drive device 30 will present a block interface and the legacy application can use the device as usual. However, software in the drive device 30 will detect the file system the application is trying to use, e.g. FAT, and map between it and the PB File System (UDF). This requires a lot of intelligence and memory in the drive device 30 to perform this mapping. Essentially the interface unit 20 of the drive device 30 will present the expected file system to the application and then map any changes the application writes to the native file system. This approach ensures the highest level of exchangeability but is the most complex.

As an alternative, the file system may be embedded in the basic format file system. In this case the file system used by the application can be embedded in the basic file system. The application file system will appear as a single file in the basic file format. This is less complex than the first proposal but reduces exchangeability. Files stored in the basic file system will not be seen by devices that use one of the embedded file systems and vice versa. Multiple different application file systems can be supported and each embedded separately in the basic file system. As an example, legacy file systems can be embedded within the PB file system (UDF). The legacy file systems then appear as individual files within UDF.

As a further alternative, the application can be presented with a logical address space and can be embedded within the main file system. In this case the application is presented with a logical address space, just like a block device, and the application can write any data in this address space. The drive device 30 makes no attempt to interpret the data written to this logical address space. Any device that does not mount the basic file system will be presented with this logical address space and can write to it This means that different devices may overwrite the content stored by other applications, e.g. if they use different file systems. The size of the logical address space is limited by the free space in the main file system. As an example, a partition can be embedded in the PB file system. This partition will be presented to legacy devices and they can write any data within that partition.

The basic disc format will allow partitioning so that one partition can be assigned to the basic file system but a second partition can be presented to legacy devices. Free space can be moved between the two partitions dynamically, partitioning of the disc. One partition is used for the PB format (UDF) and another partition can be used to present a block device to legacy devices. Free space can be dynamically moved between the two partitions.

The flexible logical format PB as defined in the disk navigation area DN allows for multiple content types to coexist on a single disc and allow multiple devices to all read the same disc. In addition, legacy devices that are unaware of the PB format can also use PB discs.

FIGS. 2 to 6 show different volume structures or layouts of a logical format of an information area IA arranged on the spiral track provided on the optical disc 10, according to the preferred embodiment of the present invention. The information area IA provided on the optical disc 10 consists of lead-in LI, program area PA, and lead-out LO.

Figure 2:
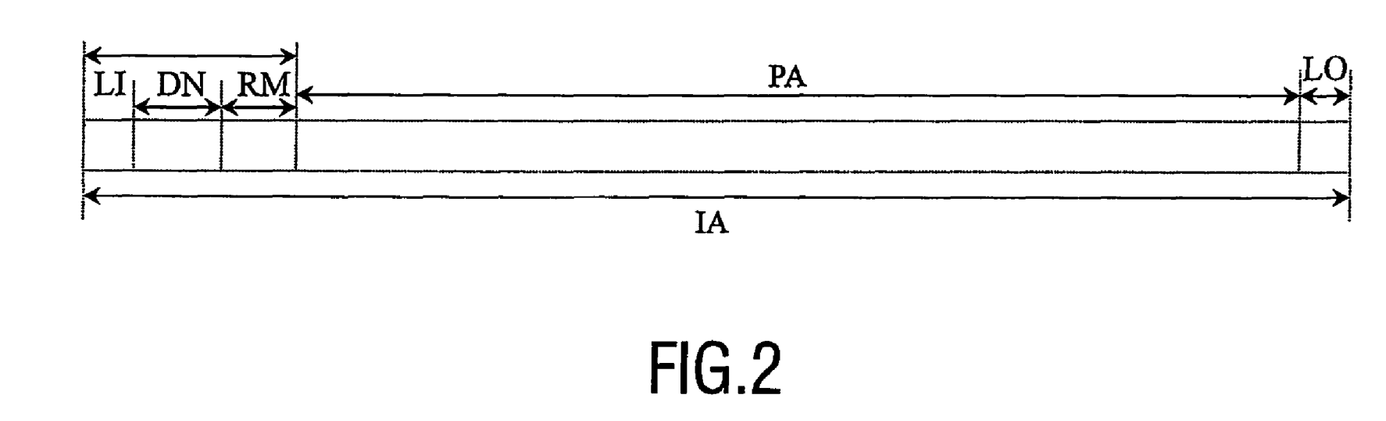
FIG. 2 shows a schematic diagram of a logical format of an information area of an optical disc with a disc navigation area according to the preferred embodiment.

According to FIG. 2, the lead-in LI includes the disc navigation area DN and a rights management area RM. It may also include a defect management area (not shown in FIG. 2). There are several types of generic structures in the disc navigation area DN, including a disc descriptor (DD), partition descriptors (PD), and application use areas (AUA). The disc descriptor identifies the disc 10 and contains data on the disc type, as well as, specifying parameters applying to the disc as whole, e.g. size, fragment size. The partition descriptors describe the type and nature of each partition on the disc 10 as well as the space associated with the partition. The disc 10 is subdivided into fragments. Which fragments belong to which partition (if any) and whether special rules apply to a partition is recorded in the partition descriptors. Partitions can be owned by applications. Application use areas are used to store application specific data available to the physical, logical or application layer, e.g. physical hard links.

Table 1 shows a sample structure for a disc descriptor of a total size of 2048 bytes according to the preferred embodiment, wherein the asterix (*) indicates default values which may be provided by the standard.

TABLE 1

| Disc Descriptor | | |
|---|---|---|
| Descriptor_ID | | 8 bits |
| Disc_ID | | 32 bits |
| Disc_Type | | 16 bits [0] |
| Flags | read-only | 1 bit [0] |
| | has_PD (partition descriptors) | 1 bit [0] |
| | has_AUA (application use areas) | 1 bit [0] |
| | has_RM (rights management area) | 1 bit [1] |
| | has_SP (sparing area) | 1 bit [1] |
| | has_defectmanagement | 1 bit [1] |
| | reserved | 1 bit [0] |
| | reserved | 1 bit [0] |
| Reserved | | 8 bits [0] |
| Fragment_size | | 16 bits |
| Number_of_Partition_descriptors | | 16 bits [0] |
| Number_of_Application_Use_descriptors | | 16 bits [0] |
| Compliance_level | | 8 bits |
| Disc_description (text) | | 256 bytes |
| Defect_table | DT_begin | 32 bit [*] |
| | DT_length | 32 bit [*] |
| Sparing_area | SP_begin | 32 bit [*] |
| | SP_length | 32 bit [*] |
| Reserved | | 1760 bytes |
| Total size | | 2048 bytes |

The fragment size determines the granularity of the virtual grid and therefore determines the minimum extent size for partitioning.

Table 2 shows a sample structure for a partition descriptor of a total size of 2048 bytes according to the preferred embodiment, and tables 3 and 4 show respective a sample values of an allocation class ID and a defect management type to be used in the partition descriptor.

TABLE 2

Partition Descriptor

| | | |
|---|---|---|
| Descriptor_ID | | 8 bits |
| Partition_ID | | 32 bits |
| Partition_type | | 16 bits |
| Flags | read-only | 1 bit [0] |
| | has_allocation_class | 1 bit [0] |
| | has_application | 1 bit [0] |
| | has_own_defectmanagement | 1 bit [0] |
| | reserved | 1 bit [0] |
| | reserved | 1 bit [0] |
| | reserved | 1 bit [0] |
| | reserved | 1 bit [0] |
| Compliance_level | | 8 bits |
| Allocation_class_ID | | 8 bits [0] |
| Appilcation_ID | | 16 bits [0] |
| Reserved | | 24 bits [0] |
| Partition_description (text) | | 256 bytes |
| Defectmanagement_type | | 8 bits [0] |
| Defect_table | DT_begin | 32 bit [0] |
| | DT_length | 32 bit [0] |
| Sparing_area | SP_begin | 32 bit [0] |
| | SP_length | 32 bit [0] |
| Total_Size [bytes] | | 64 bits |
| Allotment | Number_of_Extents (n) | 16 bits [1] |
| | for i = 1 to | |
| | Number_of_Extents | |
| | start_extent | 32 bits |
| | length_extent | 32 bits |
| | next i | |
| Reserved | | 1750-n*8 bytes |
| Total size | | 2048 bytes |

TABLE 3

Allocation_class_ID

| | |
|---|---|
| 0 | Best Effort Data |
| 8 | Start-up files |
| 9 | Volatile files |
| 10 | Robust files |
| 16 | Low bit rate streaming |
| 17 | Medium bit rate streaming |
| 18 | High bit rate streaming |
| 24 | Enhanced Multimedia Files |

TABLE 4

Defectmanagement_type

| | |
|---|---|
| 0 | no partition based defect management |
| 1 | no defect management |
| 2 | partition specific area |
| 3 | fragment fringes |

Table 5 shows a sample structure for an application use descriptor of a total size of 512 bytes according to the preferred embodiment.

TABLE 5

Application Use Descriptor

| | |
|---|---|
| Descriptor_ID | 8 bits |
| Application_ID | 32 bits |
| Application_type | 16 bits |
| Flags  read-only | 1 bit [1] |
|   requires_authentication | 1 bit [1] |
|   AUF_encrypted | 1 bit [0] |

TABLE 5-continued

Application Use Descriptor

| | |
|---|---|
| has_pointers | 1 bit [0] |
| has_additional_sections | 1 bit [0] |
| has_partition | 1 bit [0] |
| reserved | 1 bit [0] |
| reserved | 1 bit [0] |
| Reserved | 8 bits [0] |
| Application_Use_desription (text) | 256 bytes |
| Partition_ID | 32 bits [0] |
| Number_of_additional_sections (n) | 32 bits [0] |
| Application_Use_Field | .. bytes |
| Total size | 512 bytes |

As an example, the parameter value Application_ID=0 may be reserved for the drive device 30. The read-only flag pertains to unauthorized applications only. Furthermore, encryption can be performed by the application or by the drive device 30. If it is performed by the application, the parameter AUF_encrypted is set to zero.

All descriptors in the disk navigation area DN are, in principle, maintained by the drive device 30 and are accessible by the logical layer with corresponding access commands, such as get_ . . . ( ) and write_ . . . ( ) commands, although not all fields may be accessible. The application use area can be accessed by applications with corresponding access commends, e.g. get_ . . . ( ) and write_ . . . ( ) commands. The access control is done by the logical layer.

The logical format of PB may start with a contiguous physical address space of at least 1 GB as delivered by the physical layer. The provisions may then enable the concurrent storage of a wide variety of applications and optimize for power consumption. Areas are collections of fragments which are collections of contiguous ECC (Error Correction Code) blocks, thus building a virtual grid. The fragment size may be optimized for single transfer to/from buffers, e.g. 2-4 MB. Based on their own allocation rules, applications may allocate data in parts or multiples of fragments. ECC blocks are collections of sectors. As a starting point, the PB ECC blocks and sectors may comply to the Blu-ray Disc standard. However, the ECC block size may be 32 KB.

The logical format will be able to abstract the properties of the optical disc from the host. This means that defect management but also power efficiency measures, if any, can be implemented in the drive device 30.

Compared to traditional (CD) sessions the PB sessions can be without separate lead-in and lead-out areas. Furthermore, they may have a granularity of one fragment and not necessarily need to be contiguous. Moreover, the sessions not necessarily need to be fixed regarding size and physical location after initialization, e.g. in case of a dynamic partitioning. The sessions may have a volume based rights management and/or a volume based, partition based or fragment based defect management.

The disc navigation area DN, which may be considered an extended PMA [Program Memory Area as defined in Orange Book], can thus offer hooks for describing sessions identity, content properties, with application specific re-mapping pointers and room for configuration data.

The information area IA as shown e.g. in FIG. 2 consists of the lead-in area LI, the lead-out area LO, the disc navigation area DN, the digital rights management area RM, and the program area PA. The program area PA is subdivided into fragments of e.g. 64 ECC blocks of 32 KB (=2 MB). On a 1

GB disc the disc navigation area DN and the rights management area RM may consist of one fragment.

There may be a lead-in area LI outside of the logical address space to aid physical navigation to the begin of the address space. The lead-in area may contain the address of the last physical block on the medium. This information may be stored in the disc navigation area DN. The disc navigation area DN and the rights management area RM are part of the lead-in area LI. Additionally, there is provided a (small) lead-out area LO outside of the logical address space to aid physical navigation to the end of the address space.

The disc navigation area DN may consist of e.g. 44 ECC blocks on the inside of the disc 10. As already mentioned, the disc navigation area DN is a space reserved for pointers and application specific data which can be used by the interface unit 20 of FIG. 1 to access the disc 10. The pointers in the disc navigation area DN can be used by the interface unit 20 to effectively partition the PB disc into separate areas. It can also be used by the interface unit 20 to determine the location of the initial address number 0 in the logical address space for the disc 10 as a whole or for a specific application. Furthermore, it can be used by for reserving space in the program area for specific file systems, allocation classes or applications. Reserving can be either inclusive, i.e. allowing other uses, or exclusive, i.e. dedicated for one use only. Moreover, the disc navigation area DN can be used by the interface unit 20 to assign properties or attributes to the reserved space, and/or to provide pointers into the reserved space and room for application specific data.

The area's defined in the disc navigation area DN are in units of fragments but do not necessarily consist of contiguous sets of fragments. Nor is the allocation of fragments to area's defined in the disc navigation area fixed. A useful part of the disc navigation area DN should be cacheable by the drive device 30, e.g. in a NVRAM/CID (Non-Volatile RAM/Chip In Disc). Examples of the use of the disc navigation area DN will be described below.

Figure 3:
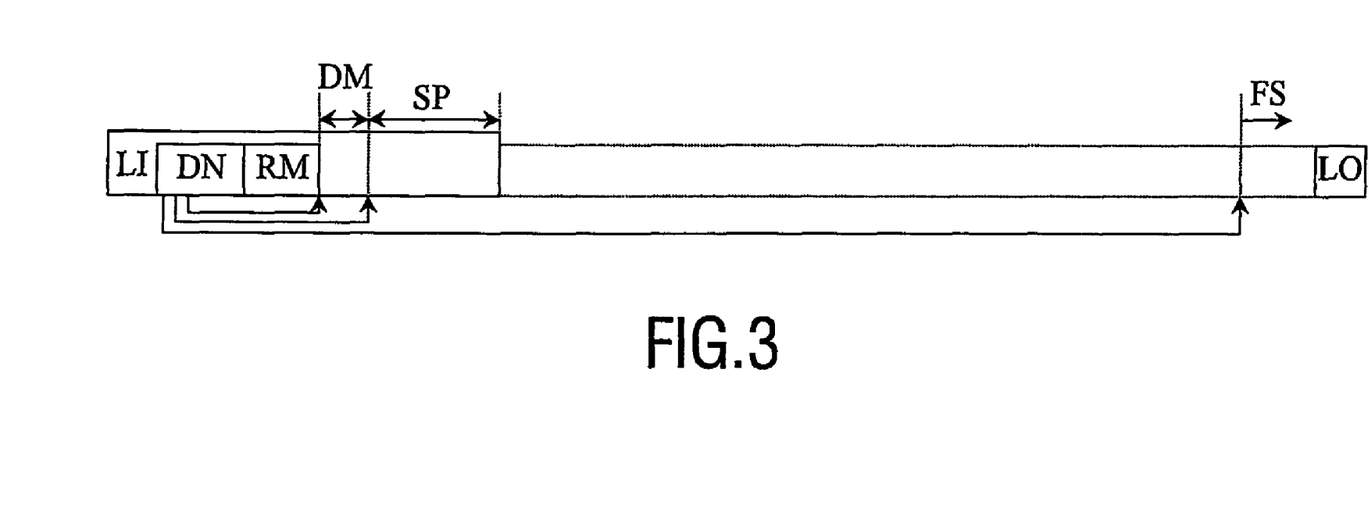
FIG. 3 shows a schematic diagram of a logical format of a default program area referred to by a disc navigation area according to the preferred embodiment.

FIG. 3 shows a schematic diagram of a logical format of a default program area consisting of a Defect Management area (DM), a sparing area (SP), an area for user data and an area FS reserved for the file system. Note that these areas themselves are optional as are the locations of these areas. The starting points of the areas are recorded in the disc navigation area DN, as well as, optionally, their size.

Figure 4:
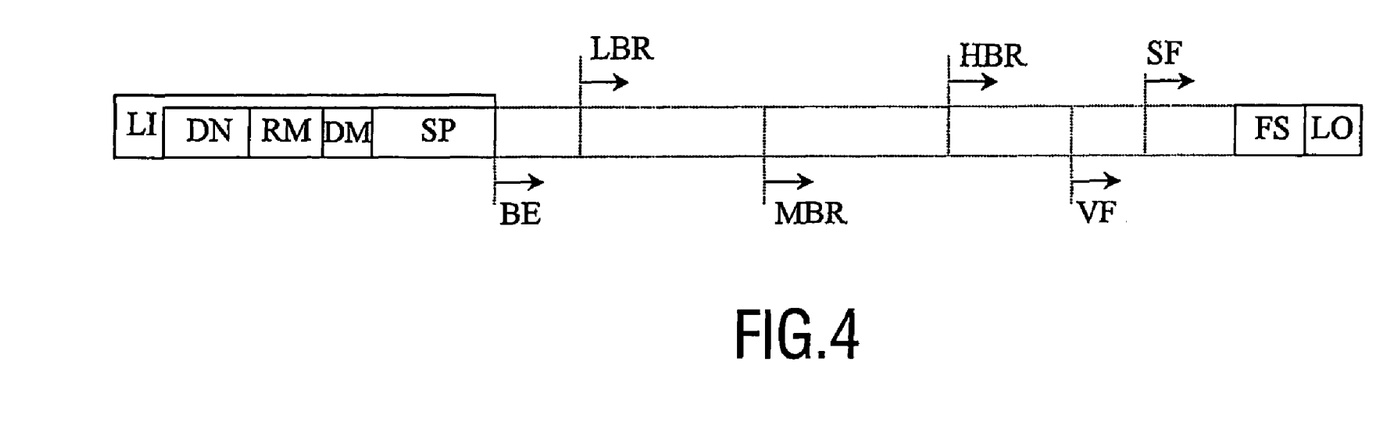
FIG. 4 shows a schematic diagram of a logical format of an information area with a sample program area according to preferred embodiment.

FIG. 4 shows a schematic diagram of a logical format of the information area IA with a sample program area according to the preferred embodiment.

For certified allocations classes, specific areas can be reserved in the program area. Reserving space or area and assigning a allocation class are separate actions. The allocation class should be considered one property of that area. Multiple allocation classes may be applicable to one area For each area defined in this manner separate allocation strategies may apply. The allocation classes for areas are recorded in the disc navigation area DN. Different allocation strategies apply to the different allocation classes.

In general, from a perspective of limiting power consumption it is probable optimal to allocate files that are read often towards the outside of the disc 10 and files that are written often a little more to the inside. File system data combines both aspects and should be allocated farthest to the outside.

The default allocation class is best effort data. This applies, for instance, to the free space in the default program area. All space that is not reserved is considered available to this class. By default this class has defect management by re-mapping. The defect management area DM and the sparing area SP are defined at the beginning of the area as described above. The default starting location of the area BE available to this class is on the inside of the disc.

Note that all areas are readable by a general purpose operating system (OS). Standard OS functionality can also write to the area BE available to the best effort allocation class. To write to other areas a certified application is needed, which can also be part of the OS.

It is noted that the following allocation classes make sense specifically if the drive operates using constant angular velocity (CAV). The latter means that the read/write speed on the outside of the disc is more than 2 times that on the inside.

Start-up files are files that applications use to start their operation and that need to be read each time the application is started. One allocation class may be start-up files. An area SF for this class is typically located towards the outside of the disc for read speed. An abstract may be cached in an NVRAM/CID for mount optimization or prevention. Separate pointers to start-up files may be recorded in the disc navigation area DN.

Volatile files are files of a certain size that are written often, i.e. more than a predetermined number of times. An area VF for this class is typically located towards the outside of the disc 10 or write speed. Volatile files may need to be relocated. One strategy may be to relocate the file each time it is written. The space reserved for volatile files then should be at least double of the expected combined size of the volatile files.

Another option would be to record the allocation history of volatile files in the disc navigation area DN and re-allocating them if written as many times as half the expected recyclability of the medium.

Robust files are files that are to be stored in a manner not susceptible to physical damage. This can be achieved by having companion areas one on the inside of the disc and one, diametrically opposed on the outside and writing the file to each area, i.e. physical distant mirroring.

Depending on the definition low bit rate streaming files may be written in an area LBR available for the best effort allocation class. The area LBR for these file may be allocated to the inside of the disc 10 with real-time file allocation or in the middle of the address space with re-mapping based defect management. Or put in another way, contiguous on the inside and with limited fragmentation in the middle.

Depending on the definition it may be required to reserve an area for a medium bit rate streaming class with an allocation unit of, for instance, twice the fragment size.

An area MBR for these files may be allocated in the middle of the disc 10 with real-time file allocation or towards the outside of the disc with re-mapping based defect management. Toward the outside more fragmentation may be permissible.

Depending on the definition it may be required to reserve an area for high bit rate streaming class with an internal allocation units size of several times the fragment size.

An area HBR for these files may be allocated in the middle of the disc 10 with real-time file allocation or towards the outside of the disc with re-mapping based defect management.

Additionally, an area (not shown) may be provided for enhanced multimedia files.

Figure 5:
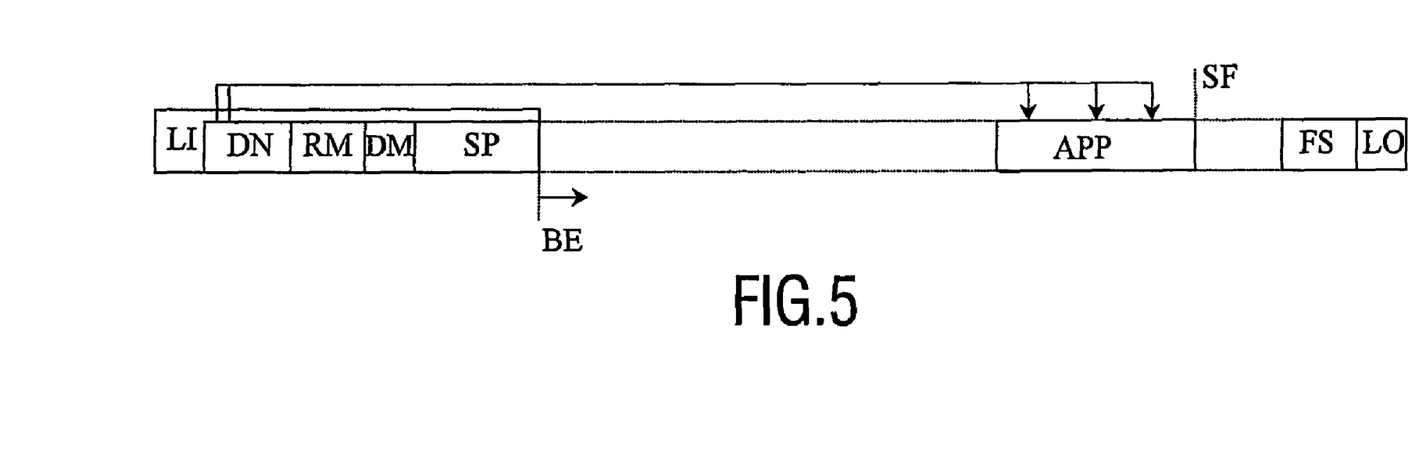
FIG. 5 shows a schematic diagram of a logical format of an information area with an application reserved area according to preferred embodiment.
Figure 6A:
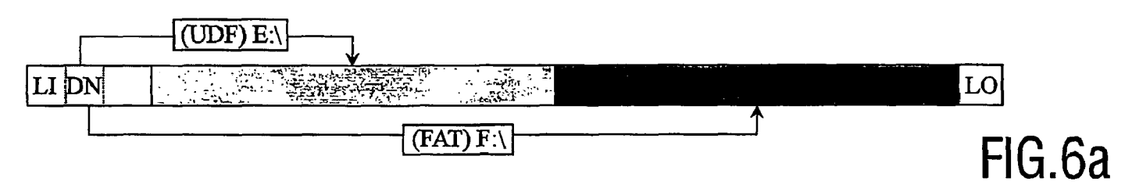
FIG. 6 shows schematic diagrams of logical sample formats of different aspects of partitioning according to the preferred embodiment.
Figure 6B:
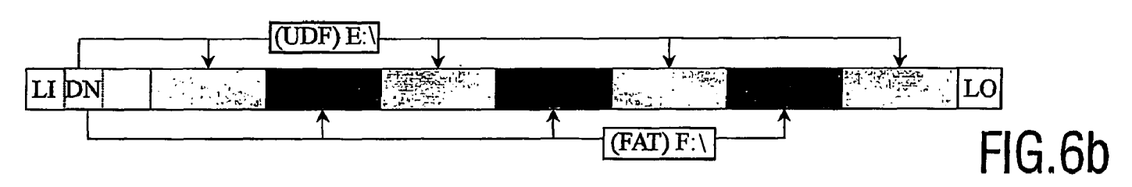
Figure 6C:
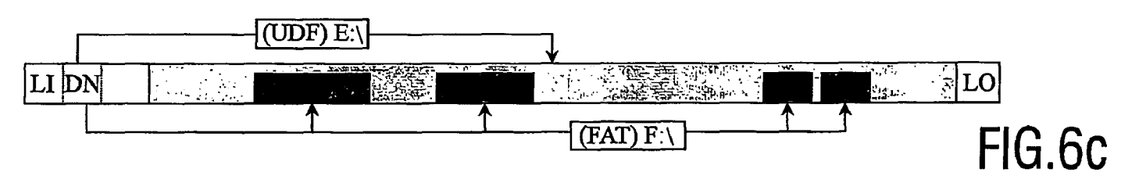
Figure 6D:
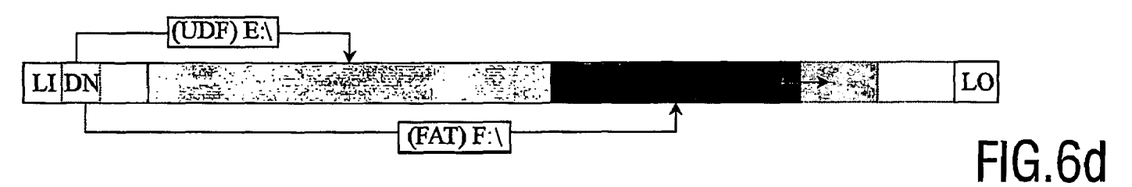

FIG. 5 shows a schematic diagram of a logical format of an information area with an application reserved area according to preferred embodiment.

All applications can use allocation classes as defined for a specific disc. Certified or compliant applications can reserve an area APP for themselves applying one of the existing allocation classes. Also this area APP may have certain properties like defect management.

Application specific data can be defined in the disc navigation area DN, e.g. multiple entry points into the data recorded for a specific application. This offers the opportunity to apply seek optimization, e.g. special access patterns, to limit the power consumption. For some applications the drive device 30 may be able to select an application class optimal for its purpose without the aid of the application.

Note that the host, drive device 30 or application may choose to record in the disc navigation area DN the location of data that is often accessed or record access patterns to optimize retrieval of data which is often accessed in sequence, i.e. pre-emptive caching, or reallocate data optimized for observed retrieval patterns.

FIG. 6 shows schematic diagrams of sample logical formats of different aspects of partitioning. In particular, FIG. 6(*a*) shows an example of two straightforward logical partitions, where specific pointers or entry points are stored in the partition descriptor to define a first partition for a UDF file system, e.g. E:\, and a second partition for a FAT file system, e.g. F:\. Furthermore, FIG. 6(*b*) shows an example of an interleaved partitioning with a plurality of partitions allocated to the first and second file system, respectively. FIG. 6(*c*) shows an example of an embedded partitioning, where the FAT file system appears as individual files in the UDF file system. Finally, FIG. 6(*d*) shows an example of dynamically sized partitions, where free space is dynamically moved between the two partitions of the FAT and UDF file systems.

The partitioning can be based on a virtual partitioning which refers to implicit partitions which are not defined explicitly, i.e. shape, boarders and size of these data sub-regions are not prescribed but can change dynamically, which leaves the choice for implementations to fit the intended purpose. Further details concerning the virtual or implicit partitioning can be gathered e.g. from document WO 01/95331 A2. Defect management can be performed for each partition separately.

It is noted that the present application is not restricted to the above specific embodiments but can be used for any file system and disc format of a drive device having an interface unit through which a host device can be connected. Moreover, any predetermined area on the disc can be used as a navigation area for storing logical level and/or application level data to provide the flexible disc format. The preferred embodiments may thus vary within the scope of the attached claims.

The invention claimed is:

1. A drive device for providing access to a record carrier having a universal disc format standardized to be independent of an application format used on said record carrier thus allowing files to be written on the record carrier in multiple formats while allowing specific low level optimizations for specific applications, said drive device comprising:

access means for providing at least one of a read access and a write access to at least one predetermined parameter written on a predetermined navigation area on said record carrier, said at least one predetermined parameter specifying at least one of a logical format and an application format used on said record carrier, wherein said access means is arranged to write to said navigation area a location information of data accessed at a rate higher than an access pattern information for sequential data retrieval, wherein the record carrier is partitioned into separate areas, where the areas are in units of fragments, the partitions comprising at least a first partition assigned to a basic file system and a second partition presentable to legacy devices for storing files in at least a first file format associated with a first legacy device and a second file format associated with a second legacy device so that a first access device accesses first content in said first file format and a second access device accesses second content in said second file format, the first content type being different from the second content type, and wherein said access means is further configured to see all files of multiple formats included in the record carrier including recognizing a file having one format on the record carrier without understanding content of the file, and ignoring the file having the one format, wherein said at least one predetermined parameter further specifies a partition descriptor information (PD) for specifying a fragment allocation to define a not necessarily contiguous space associated with each of said first and second partitions, wherein remaining unassigned fragment allocations may be dynamically assigned to one of the at least first and second partitions, thereby dynamically extending the first and second partitions.

2. The device according to claim 1, wherein said at least one predetermined parameter comprises a disc descriptor information for specifying at least one of an identification of said record carrier, a type of said record carrier, and parameters applying to said record carrier as a whole.

3. The device according to claim 1, wherein said partition descriptor information further specifies at least one of a nature of each partition on said record carrier, a type of each partition on said record carrier, a space associated with each partition on said record carrier, a fragment allocation to each partition on said record carrier, and specific rules for recording on each partition on said record carrier.

4. The device according to claim 1, wherein said access means is configured to provide at least one of a read access and a write access to an application use area provided in said navigation area for storing an application specific information available to at least one of a physical layer, a logical layer and an application layer of said drive device.

5. The device according to claim 1, wherein said at least one parameter of said navigation area is accessible by at least one of a logical layer and an application layer of said drive device by using a predetermined access command.

6. The device according to claim 1, wherein said access means is arranged to provide a caching function for caching at least a part of the information provided on said navigation area.

7. The device according to claim 1, wherein said access means is arranged to use pointers stored in said navigation area for partitioning said record carrier into separate areas.

8. The device according to claim 1, wherein said access means is arranged to use said navigation area for determining the location of a starting address number in the logical address space for said record carrier as a whole or for a specific application.

9. The device according to claim 1, wherein said access means is arranged to use said navigation area for reserving space in a program area of said record carrier for specific file systems, allocation classes or applications.

10. The device according to claim 9, wherein said access means is arranged to use said navigation area for assigning properties or attributes to said reserved space.

11. The device according to claim 9, wherein said access means is arranged to use said navigation area for providing pointers into said reserved space and room for application specific data.

12. The device according to claim 1, wherein said access means is arranged to use pointers stored in said navigation area for applying a seeking function.

13. The device according to claim 1, wherein said access means is arranged to use said navigation area for selecting an application class for an application.

14. The device according to claim 1, wherein said access means is arranged to use a dynamic partitioning for defining areas in said navigation area.

15. The device according to claim 1, wherein said access means is arranged to apply a volume-based rights management to sessions of an information area of said record carrier.

16. The device according to claim 1, wherein said access means is arranged to apply a volume-based, partition-based or fragment-based defect management to sessions of an information area of said record carrier.

17. The device according to claim 1, wherein said drive device is a removable drive device for an optical disc.

18. The device according to claim 1, wherein said drive device comprises a standard interface for storage devices.

19. The device according to claim 18, wherein said standard interface is a PCMCIA, Compact Flash, Newcard, or MMCA interface.

20. The drive device of claim 1, wherein said at least one predetermined parameter further specifies an allocation history of volatile files and, based on the history, said access means being further configured to re-allocate volatile files if written as many times as half an expected recyclability of the record carrier.

21. The drive device of claim 1, wherein said access means is further configured to present an application with the predetermined navigation area for writing desired data in the predetermined navigation area for allowing the drive device to recognize the file on the record carrier without understanding the content of the file.

22. A record carrier having a universal disc format standardized to be independent of an application format used on said record carrier thus allowing files to be written on the record carrier in multiple formats while allowing specific low level optimizations for specific applications, the record carrier for storing data on an information area thereof, wherein said information area comprises a navigation area for storing at least one predetermined parameter specifying at least one of a logical format and an application format used on said record carrier, wherein said navigation area include location information of data accessible at a rate higher than an access pattern information for sequential data retrieval, wherein the record carrier is partitioned in separate areas, where the areas are in units of fragments, the partitions comprising at least a first partition assigned to a basic file system for storing files in a first file format and a second partition presentable to legacy devices for storing files in at least a first file format associated with a first legacy device and a second file format associated with a second legacy device so that a first access device access the first content in said first file format and a second access device accesses the second content in said second file format, the first content type being different from the second content type wherein space is dynamically moved between the first partition and the second partition, and wherein said at least one predetermined parameter allows a device to recognize a file having one format on the record carrier without understanding content of the file and to ignore the file having the one format, wherein said at least one predetermined parameter further specifies a partition descriptor information (PD) for specifying a fragment allocation to define a not necessarily contiguous space associated with each of said first and second partitions, and wherein remaining unassigned fragment allocations may be dynamically assigned to one of the at least first and second partitions, thereby dynamically extending the first and second partitions.

23. The record carrier according to claim 22, wherein said navigation area is arranged in a lead in area of said information area.

24. The record carrier according to claim 22, wherein sessions provided in said information area are written without separate lead-in and lead-out area.

25. The record carrier according to claim 22, wherein sessions provided in said information area have a granularity of one fragment.

26. The record carrier according to claim 22, wherein sessions provided in said information area have at least one of a varying size and a varying physical location.

27. The record carrier of claim 22, wherein said at least one predetermined parameter further specifies an allocation history of volatile files.

28. A method of reading from or writing to a record carrier, said method comprising the acts of:

providing on said record carrier a predetermined navigation area;

writing on said navigation area at least one predetermined parameter specifying at least one of a logical format and an application format used on said record carrier, including writing to said navigation area a location information of data accessed at a rate higher than an access pattern information for sequential data retrieval;

using said at least one predetermined parameter for at least one of a read access and a write access to said record carrier;

presenting an application with the predetermined navigation area for writing desired data in the predetermined navigation area for allowing a device to recognize a file having one format on the record carrier without understanding content of the file, and ignoring the file having the one format;

wherein the record carrier is partitioned in separate areas, where the areas are in units of fragments, the partitions comprising at least a first partition assigned to a basic file system for storing files in a first file format and a second partition presentable to legacy devices for storing files in at least a first file format associated with a first legacy device and a second file format associated with a second legacy device so that a first access device access the first content in said first file format and a second access device accesses the second content in said second file format, the first content type being different from the second content type wherein said at least one predetermined parameter further specifies a partition descriptor information (PD) for specifying a fragment allocation to define a not necessarily contiguous space associated with each of said first and second partitions, wherein remaining unassigned fragment allocations may be dynamically assigned to one of the at least first and second partitions, thereby dynamically extending the first and second partitions.

29. The method of claim 28, wherein said at least one predetermined parameter further specifies an allocation history of volatile files, and the method further comprising the act of re-allocating volatile files if written as many times as half an expected recyclability of the record carrier as determined from the history.

* * * * *